United States Patent [19]

Olander

[11] Patent Number: 4,649,795

[45] Date of Patent: Mar. 17, 1987

[54] STRUCTURAL SHROUD SYSTEM INCORPORATING A PYROTECHNIC

[75] Inventor: Donald E. Olander, Westminster, Calif.

[73] Assignee: Hi-Shear Corporation, Torrance, Calif.

[21] Appl. No.: 610,753

[22] Filed: May 16, 1984

[51] Int. Cl.⁴ .......................... F42B 1/00; B64D 7/00
[52] U.S. Cl. ................................ 89/1.14; 89/1.817; 244/121; 244/130
[58] Field of Search .................. 89/1.14, 1.817, 1.816, 89/1.812; 244/121, 130

[56] References Cited

U.S. PATENT DOCUMENTS

| | | | |
|---|---|---|---|
| 2,844,073 | 7/1958 | Ré et al. | 89/1.817 X |
| 3,140,638 | 7/1964 | DeLuca | 89/1.817 |
| 3,561,703 | 2/1971 | Stencel | 244/121 X |
| 3,674,227 | 7/1972 | Jacobson et al. | 244/121 |
| 3,880,387 | 4/1975 | Martin | 244/121 |
| 3,970,006 | 7/1976 | Copeland et al. | 89/1.14 |
| 4,275,858 | 6/1981 | Bolton et al. | 244/121 |
| 4,301,708 | 11/1981 | Mussey | 89/1.817 |
| 4,389,030 | 6/1983 | San Miguel | 244/121 X |
| 4,402,774 | 9/1983 | Olander et al. | 149/19.3 |

Primary Examiner—David H. Brown
Attorney, Agent, or Firm—Donald D. Mon

[57] ABSTRACT

A shroud to protect airborne stores from excessive temperatures generated by aerodynamic friction. The shroud includes a structural member which acts as a cover that comprises a matrix and a pyrotechnic. The autoignition temperature is above that of the temperatures which are generated. Upon ignition, the pyrotechnic mixture and the structural element disintegrated into gases or into particles which are so small as not to constitute a risk to nearby structure in flight.

14 Claims, 2 Drawing Figures

STRUCTURAL SHROUD SYSTEM INCORPORATING A PYROTECHNIC

FIELD OF THE INVENTION

This invention relates to the protection of airborne stores which are wholly or partially exposed at such high speeds as to develop temperatures which would be detrimental to the stores, for example hypersonic speeds.

BACKGROUND OF THE INVENTION

Aircraft stores such as rockets are frequently carried in racks on or in aircraft where the stores are either completely or partially beyond the boundary at the airframe. This is a tolerable situation, without protection, for the stores at relatively low speeds and even at some supersonic speeds. However at very great speeds such as hypersonic speeds in the range of Mach 3 to Mach 4, the temperatures which are developed as a consequence or aerodynamic friction are so great that they would be detrimental to the stores themselves.

A somewhat obvious approach to the problem is to provide a disposable shroud over the stores so as to protect the stores, during flight, and then to jettison the shroud before it is discharged. But it is unwise to release large pieces of material to fly through the air, perhaps to enter an engine intake or otherwise damage the carrying aircraft or other aircraft in the same region. Thus the general concept of a jettisonable shroud is not acceptable.

It is an object of this invention to provide a shroud which will protect the stores from excessive temperatures during flight, which when removed is disposed of in such a way as not to be harmful to nearby structure in flight.

BRIEF DESCRIPTION OF THE INVENTION

According to this invention, a shroud is provided to cover an airborne stores such as a rocket or other armament, in order to protect it from excessive temperatures caused by aerodynamic friction. The shroud comprises a structural member which has sufficient rigidity and strength to withstand aerodynamic forces, and the property of disintegrating into gases and into particles which are so small as to constitute no appreciable hazard to nearby structure in flight. The shroud member is made of an ignitable pyrotechnic mixture contained within a matrix, which matrix will burn into gases or char into small particles when the pyrotechnic mixture is ignited. The pyrotechnic mixture when in the matrix has an autoignition temperature that is higher than the anticipated temperature to be developed in the element during the flight. Igniter means is provided to ignite the pyrotechnic mixture.

According to a preferred but optional feature of the invention, the pyrotechnic mixture has within itself sufficient reactants to generate the temperatures required to char or to burn the matrix as aforesaid, without requiring the access of atmospheric oxygen.

According to another preferred but optional feature of the invention, the material of the matrix is a carbon-containing mixture so as to more readily to char.

According to yet another preferred but optional feature of the invention, the pyrotechnic mixture is distributed throughout the matrix.

The above and other features of this invention will be fully understood from the following detailed description and the accompanying drawings, in which:

DETAILED DESCRIPTION OF THE DRAWINGS

Figure 1:
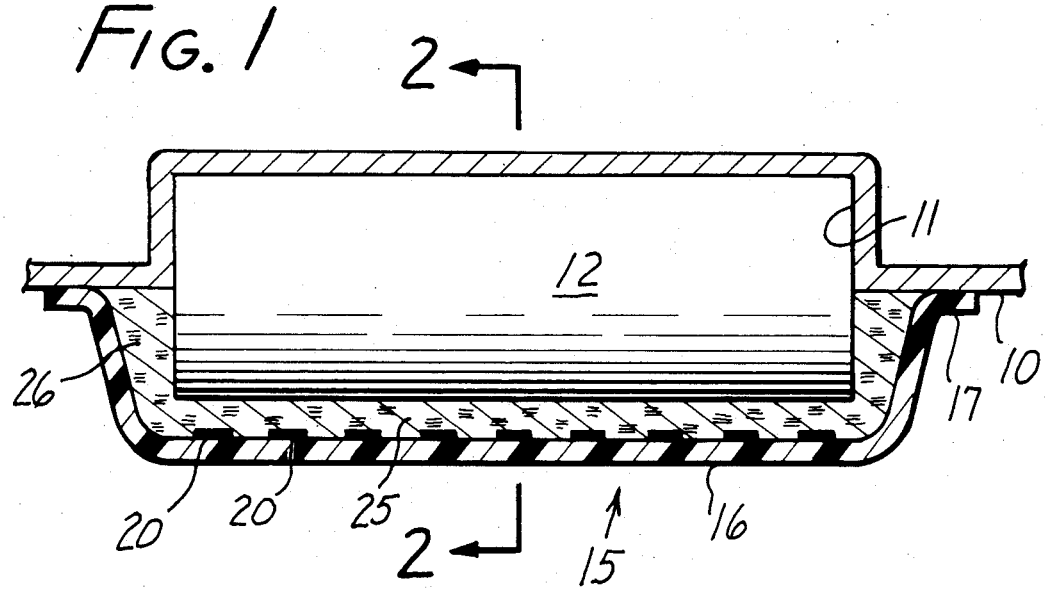
Figure 2:
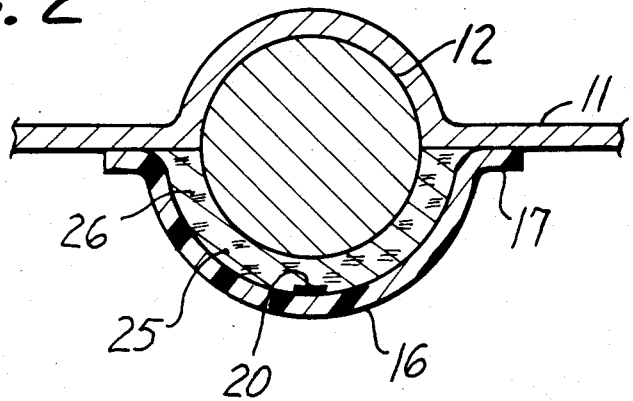

FIG. 1 is an axial cross-section showing the presently preferred embodiment of the invention; and FIG. 2 is a cross-section taken at line 2—2 in FIG. 1.

BRIEF DESCRIPTION OF THE INVENTION

In FIG. 1 there is shown a fragment of the fuselage 10 of an aircraft with a cavity 11. There is shown in the recess a stores 12 which may be such as a rocket or the like. This is shown only schematically because it may take any form desired. Not shown are the means for ejecting the stores from the cavity, or for mounting the stores in it. These are not part of the invention and can be conventional. It will be noted that the stores project partially beyond the boundary of the aircraft into what would be the airstream. It is equally possible that it might have been preferred for the stores to be mounted entirely externally. This invention is useful in both arrangements.

The mounting of stores externally of aircraft without protection from the airstream is routine for subsonic and for low supersonic speeds, because excessive temperatures are not developed at such speeds. However at hypersonic speeds such as Mach 3 or Mach 4, temperatures enough to be destructive to the stores are likely to be developed. For this reason it is necessary to provide protection against this eventuality. That is the purpose of this invention.

A shroud system 15 includes a structural member 16 which is continuous and which has sufficient rigidity and strength to withstand the aerodynamic forces which will be exerted upon it, and which has the property of disintegrating into gases or into particles which are so small as to constitute no appreciable hazard to nearby structure in flight. Structural member 16 is sheet-like and extends to a flange 17 or other structure by means of which it can be attached to the airframe. Any suitable attachment means may be utilized and none is specifically shown.

The structural member is made of an ignitable pyrotechnic mixture contained within a matrix, which matrix will burn into gases or char into small particles when the pyrotechnic mixture is ignited. The pyrotechnic mixture is one which has an autoignition temperature that is higher than the anticipated temperature which will be developed in the element during flight.

Preferably the pyrotechnic mixture has within itself sufficient reactants to generate the temperatures required to char or to burn the matrix without requiring external oxygen from the atmosphere, although this is not necessary. Similarly it must be provided in sufficient quality to destroy the matrix in the manner which will shortly be described.

Preferably the pyrotechnic is a two-substance system. The preferred embodiment is a mixture of magnesium metal and silicon dioxide. Alternatively, mixtures of iron oxide and aluminum metal may instead be used. Examples of suitable mixtures of magnesium and silicon dioxide are shown in Olander and Peterson U.S. Pat. No. 4,402,774, which is incorporated herein by reference in its entirety for the showing of a pyrotechnic with these substances. Instead of utilizing polybutadiene or Teflon as recited in the examples in the patent, the matrix material will be selected from a group which is more substantial as to structural properties. A good range of ratios of magnesium to silicone dioxide is by weight between about 2:1 and 3:1.

A potential advantage of utilizing silicon dioxide in magnesium metal is that the silicon dioxide can be provided as a structural fiber which will lend strength to the structure. Alternatively both can be provided as a fine powder. The silicon dioxide can advantageously be supplied in the finely divided form called microspheres.

The presently preferred material for the matrix is selected from the group consisting of settable phenolics, settable epoxies, and settable polyesters. The pyrotechnic is mixed into this material prior to cure, and is preferably uniformly distributed throughout, although it could instead be implanted in discrete bodies within the structure if preferred. The matrix provides for structural continuity, and the pyrotechnic itself may or may not contribute to the structural strength after it is set up. The preferred matrix substance is a phenolic resin of the type which will not produce water of formation when the cure occurs and which will not produce excessive heat during cure. It is preferred that the curing temperatures be kept below about 300 degrees Fahrenheit. A suitable modified phenolic substance for this purpose can be obtained from American Automated Inc. of Huntington Beach, Calif. under its trademark 2000. A suitable epoxy can be obtained from E. V. Roberts Company of Los Angeles, Calif. under its mark R.F. 4000.

The relative quantities of matrix material and pyrotechnic will be selected with the structural requirements for the element as well as the disintegration requirements in mind. It appears that about 12% by weight of matrix is satisfactory.

It is also preferred that the matrix be a carbon containing material for its ability to char when the pyrotechnic is ignited.

A suitable ignitor or ignitors 20 is or are implanted or attached to the inside surface of the structural member so as to ignite the pyrotechnic from the inside when the element is to be destroyed. They could instead be implanted in the matrix.

While the structural element itself provides substantial insulating properties, sometimes it may not be sufficient. For this reason a spacing 25 is left between the structural member and the stores. Within this spacing there is placed insulation 26 further to protect the stores. This insulating material is selected not only to its insulation quality, but also for its property of forming particles which are so small as to constitute no appreciable hazard to nearby structure in flight when it is disintegrated. The insulating material need not be reacted upon by the pyrotechnic, and preferably will not in order that the heat effect of the pyrotecnic will not be transmitted to the stores themselves. A suitable filling is selected from the group consisting of cork, carbon foam, and carbon-carbon laminar structures which have only slight laminar strength. It is preferred that the cork be provided as a fine powder because this is an excellent insulator and when released simply flies away as a powder. The foam will readily disintegrate and the laminar structures are so flimsy as to have only slight laminar strength and will not harm surrounding structure.

The presently preferred embodiment of the invention is a structure comprising about 60% magnesium metal, 28% silicon dioxide and 12% modified phenolic resin as stated above. The autoignition temperature should be in excess of 1200 degrees C.

Thus a structure is provided with a pyrotechnic with a sufficiently high autoignition temperature, that is compatible with the matrix to provide a strong structural member, and which will burn preferably without atmospheric oxygen enough for it to disintegrate the structural element so that it disintegrates into gases or particles that are fine enough that they do not endanger surrounding structures in flight. The term "structures" includes air frame, air frame surfaces and engines and their intakes, for example.

A suitable igniter will produce sufficient heat to ignite the pyrotechnic and may for example be boron-potassium nitrate or any other suitable ignitor which itself is sufficiently insensitive to the conditions to which it will be exposed.

The thickness of the structural element will of course be determined by its structural strength and structural requirements. It is anticipated that its destruction upon the ignition of the pyrotechnic will take on the order of only a small fraction of a second, which is too short a time to do any damage to the nearby airframe or to the stores which it is designed to protect.

This invention thereby provides a suitable shroud protection for externally mounted stores which is resistant to the high temperatures of very high speed flight and which can quickly be removed without risk to surrounding structures.

This invention is not to be limited by the embodiments shown in the drawings and described in the description, which are given by way of example and not of limitation, but only in accordance with the scope of the appended claims.

I claim:

1. A shroud to cover an airborne article to protect said article from excessive temperatures caused by aerodynamic friction, said shroud comprising a structural member having sufficient rigidity and strength to withstand aerodynamic forces, and the property of disintegrating into gases, or into particles which are so small as to constitute no appreciable hazard to nearby structure in flight, said member being made of an ignitable pyrotechnic mixture contained within a matrix, which matrix will burn into gases or char into particles when said pyrotechnic mixture is ignited, which particles are so small as to constitute no appreciable hazard to nearby structure in flight having an autoignition temperature higher than the anticipated highest temperature to be developed in said element during flight; and igniter means to ignite said pyrotechnic mixture.

2. A shroud according to claim 1 in which said pyrotechnic mixture is dispersed throughout said matrix.

3. A shroud according to claim 1 in which said matrix is a carbon-containing composition.

4. A shroud according to claim 3 in which said matrix is selected from the group consisting of settable phenolics, settable epoxies, and settable polyesters.

5. A shroud according to claim 1 in which the pyrotechnic mixture has within itself sufficient reactants to generate after ignition the temperatures required to char or burn the matrix as aforesaid.

6. A shroud according to claim 5 in which the pyrotechnic is a two-substance system.

7. A shroud according to claim 5 in which the pyrotechnic mixture is selected from the group consisting of a mixture of magnesium metal and silicon dioxide, and a mixture of iron oxide and aluminum metal.

8. A shroud according to claim 7 in which the pyrotechnic mixture is magnesium metal and silicon dioxide, and in which the silicon dioxide is provided as a fiber to give physical strength to the element.

9. A shroud according to claim 1 further including in combination in a spacing between said article and said element an insulating filling which, when said element is disintegrated, also forms particles which are so small as to constitute no appreciable hazard to nearby structure in flight.

10. A shroud according to claim 9 in which said insulating filling is selected from the group consisting of cork, carbon foam, and carbon-carbon laminar structures having only slight laminar strength.

11. A shroud according to claim 9 in which said filling is cork powder.

12. A shroud according to claim 11 in which said pyrotechnic comprises magnesium metal and silicon dioxide.

13. A shroud according to claim 12 in which said matrix is a carbon-containing composition.

14. A shroud according to claim 13 in which said matrix is selected from the group consisting of settable phenolics, settable epoxies, and settable polyesters.

* * * * *